April 18, 1967  M. F. REYNST  3,315,106
DISK SHAPED ELECTRIC MOTOR
Filed March 9, 1964  2 Sheets-Sheet 1

INVENTOR.
MAXIMILIEN F. REYNST
BY
AGENT

INVENTOR.
MAXIMILIEN F. REYNST
BY
AGENT

United States Patent Office 3,315,106
Patented Apr. 18, 1967

3,315,106
DISK SHAPED ELECTRIC MOTOR
Maximilien Felix Reynst, Emmasingel, Eindhoven, Netherlands, assignor to North American Philips Company, Inc., New York, N.Y., a corporation of Delaware
Filed Mar. 9, 1964, Ser. No. 350,408
Claims priority, application Netherlands, Mar. 27, 1963, 290,775
4 Claims. (Cl. 310—268)

The invention relates to an electric motor provided with two magnet assemblies coaxially arranged one on each side of a disk shaped rotor and the direction of magnetization of said magnets also being coaxial.

In known "pancake" motors the rotors are disk shaped and are provided with so-called printed circuits, and the flux of the magnets passes through the rotor in a direction at right angles to the plane of the rotor. The use of such printed circuits has a limitation in that for each coil only a limited number of turns can be provided on the rotor, so that the output torque is limited and the impedance of the said coils is low, consequently such motors are only suitable for low voltages.

According to the invention, each magnet assembly comprises at least two oppositely magnetized sections, the maximum flux in the rotor being produced by arranging like poles of the two magnets opposite one another and providing a sub-divided coil winding on a cylindrical surface surrounding the rotor shaft substantially outside the magnetic field. As a result, the flux passes radially through the coils and the output torque becomes great with small dimensions in the longitudinal direction of the rotor.

According to a further feature of the invention, the rotor coils may be provided on fingers of an annular core or disk made of ferromagnetic material, for example, laminated iron sheets having fingers which extend from the ring towards the rotor shaft entirely between the magnets, the slots between the fingers having a substantially constant width. By this construction the width of each finger increases with increasing distance from the rotor shaft, so that the inductance in the fingers is substantially constant.

Furthermore, according to the invention, a disk shaped commutator may be coaxially arranged relative to the rotor. This provides the advantage, that the entire construction can be very flat.

In addition, according to the invention, the flux through the coils may be controlled by relatively rotating the two annular magnet assemblies about their axes through one pole pitch. Thus the flux through the coil may be continuously regulated between 0 and a maximum, which permits a simple speed control.

In order that the invention may readily be carried into effect, an embodiment thereof will now be described, by way of example, with reference to the accompanying drawings, in which.

Figure 1:
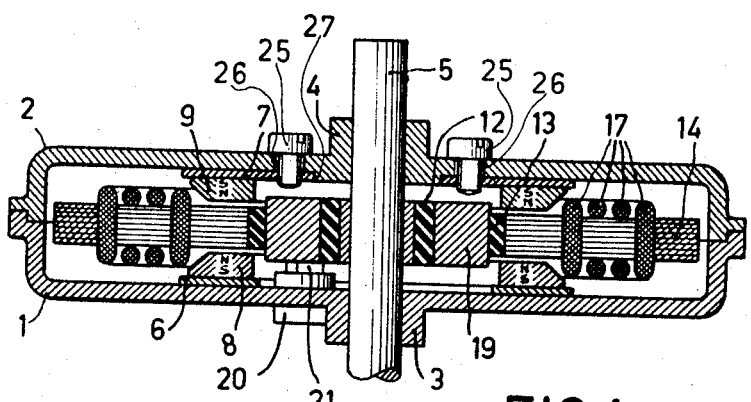
FIG. 1 is a longitudinal sectional view of a motor according to the invention.
Figure 2:
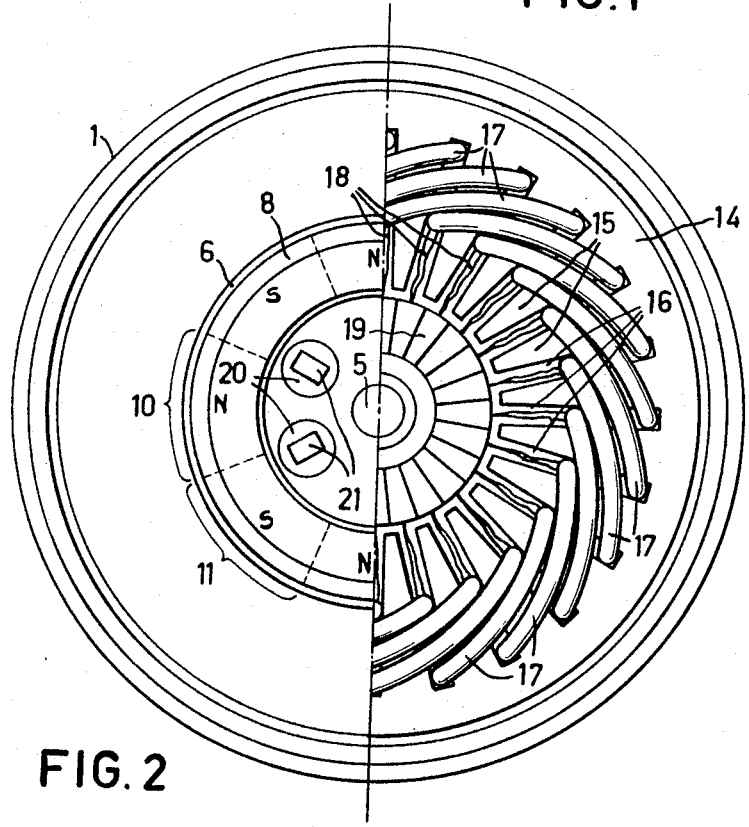
FIG. 2 is a plan view of a same motor from which the upper shield has been taken away, while in the left-hand half the rotor is removed.

Referring now to the figures, end-shields 1 and 2 form the motor housing. These end-shields include bearings 3 and 4, respectively, which support a shaft 5 of the rotor. In the embodiment under consideration, the end-shields are made of non-magnetic material and each is provided with rings 6 and 7 of soft-magnetic material on which annular permanent magnet assemblies 8 and 9, respectively, are mounted. In the said embodiment these magnets each comprise eight oppositely magnetized sections, of which two are designated by 10 and 11, respectively. The magnet sections are axially magnetized, like poles being arranged opposite one another.

Figure 3:
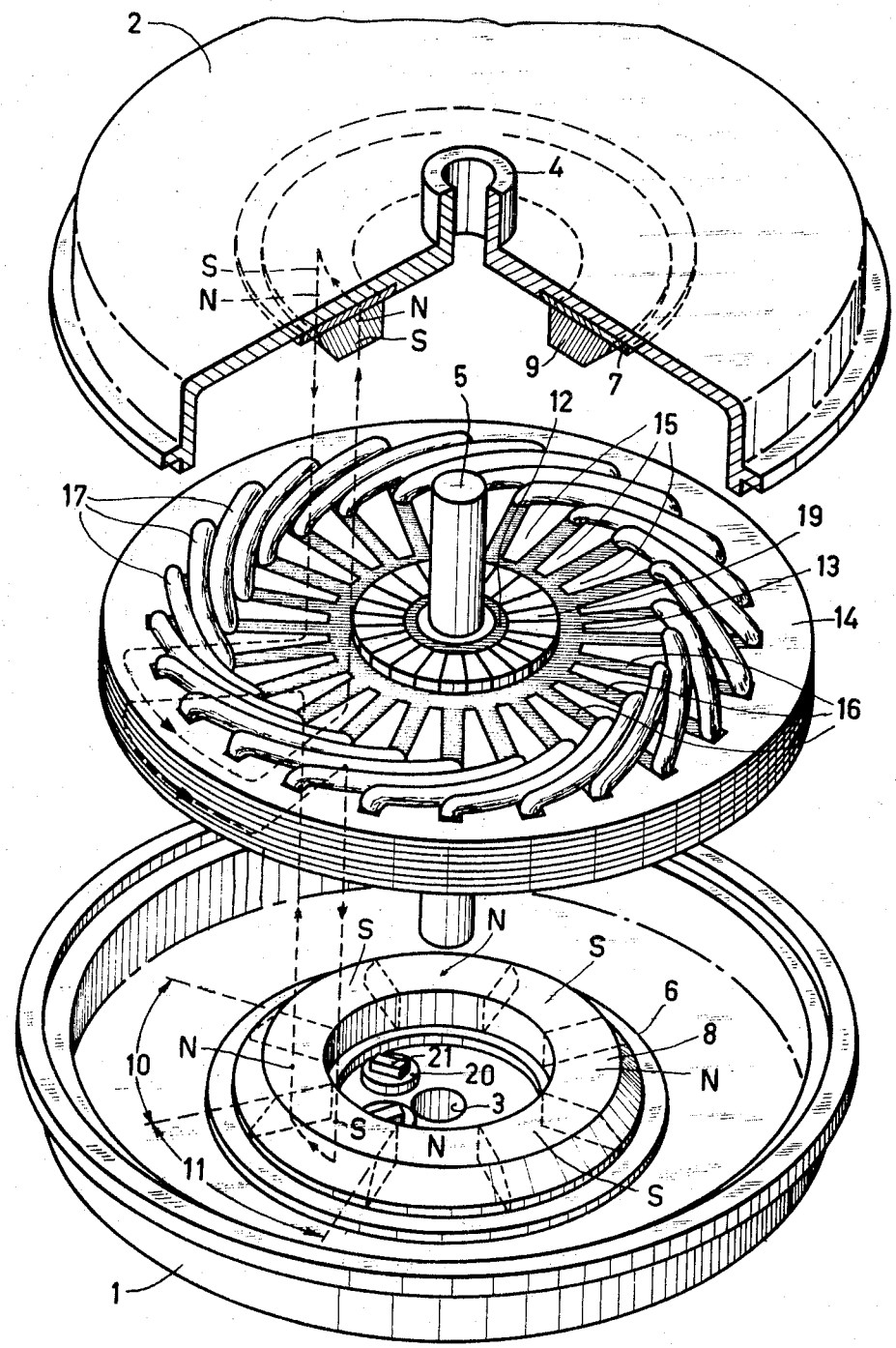
FIG. 3 is an exploded perspective view of the motor shown in FIG. 1.

Both a commutator 12 and the rotor 14 are joined together and mounted on the shaft 5 by means of a thermo-hardening material 13. This laminated rotor is provided with fingers 15 which extend inwardly towards the rotor shaft. Between the fingers 15 are formed slots 16 of substantially constant width and at the base of the slots coils 17 are so provided that each coil embraces several fingers. Lead wires 18 of these coils are connected to the commutator segments 19. Two brush-holders 20, in which brushes 21 are resiliently secured, are mounted in the shield 1. The flux of the annular magnet assemblies 8, 9 enters the rotor on both sides of the inner end of the fingers and then passes radially outwardly through the fingers 15 to the peripheral part of the rotor 14, after which it returns to the magnet assemblies. A typical flux circuit is shown in FIG. 3. Adjacent magnet sections 10 and 11 within the annular magnet assembly 8 have opposite polarity. Sections 10 and 11 are located radially inwardly of the annular ring portion of rotor 14 and in axial alignment with the fingers 15. Thus, the flux travels a path from the magnet section 10 across an air gap into the finger 15 aligned with said magnet section 10. Next, the flux travels radially outwardly along said finger 15 to the annular periphery of the rotor 14 at which point it travels along said periphery until it reaches a subsequent finger 15 which is axially aligned with the oppositely-polarized magnet section 11, said flux now travels radially inwardly along said subsequent finger 15 until it is over magnet 11 at which point it is directed toward magnet 11. The path is closed by flux flow between adjacent magnet sections 10 and 11 by means of soft magnet rings 6 and 7. A second flux circuit is formed by a corresponding pair of magnet sections in the magnet assembly 9 and the fingers 15 adjacent said sections of the rotor 14. The distinct circuits are brought about by the fact that the magnet sections of assemblies 8 and 9 are arranged so that similar poles are in confronting opposition. Annular rings 6 and 7 of soft magnet material are interposed between and in contact with the end-shields 1 and 2 and magnet assemblies 8 and 9 respectively. Since the fingers outwardly increase in width, the inductance remains substantially constant with increasing flux.

By bringing the coils over the annular part of the rotor, the radial dimensions of the windings in the slots between the fingers 15 is considerably reduced, which enables the magnet to extend over a larger part of the fingers. By designing the magnets 8 and 9 so as to be relatively rotatable through one pole pitch, a speed control is obtained in a simple manner. Such an arrangement is shown in FIG. 1 wherein the ring 7 is mounted to be rotatable about a shoulder 27 forming part of the housing 2 and can be fixed in the desired position by screws 25 which are slidable in circular slots 26 concentrically arranged about the axis of the motor.

What is claimed is:
1. An electric motor comprising a disk-like rotor mounted on a shaft; two annularly arranged magnet assemblies positioned, one on either side of and substantially concentric with said rotor, the poles of said magnet assemblies being aligned with the axis of rotation of the rotor, each of said magnet assemblies being comprised of at least two sections of alternating magnet polarity, the maximum flux on the rotor being produced by arranging said assemblies such that the poles of confronting sections have like polarity; brush means for transmitting electric current; commutator means adjacent said brush means; and coil windings on the rotor faces radially outward and substantially concentric with said magnet assemblies, said coil windings being in electrical contact with said commutator means and said brush means.

2. An electric motor according to claim 1 comprising means for moving at least one of said annular magnet assemblies about the axis of rotation of said rotor such that said magnet sections of one of said magnet assemblies are axially aligned with said magnet sections of the other magnet assembly having opposite polarity thereby effecting a speed change for said rotor.

3. An electric motor according to claim 2 wherein said rotor comprises a ferromagnetic disk having an annular outward periphery and a plurality of radially inwardly directed fingers, the axial wall sections of said fingers and the inner wall of said annular periphery defining constant width radial slots, each of said coil windings overlying at least two of said fingers and passing through the radial slots adjacent said two fingers at the inner wall of said annular periphery of said rotor, and said coil windings being positioned radially outwardly of said annular magnet assemblies.

4. An electric motor according to claim 3 wherein said commutator means is concentric with said shaft and is positioned inwardly of said rotor fingers and said rotor annulus, said commutator being interconnected with said shaft and said rotor by means of electrically insulating adhesive resin means.

References Cited by the Examiner
UNITED STATES PATENTS

| | | | |
|---|---|---|---|
| 3,023,335 | 2/1962 | Burr | 310—268 |
| 3,077,548 | 2/1963 | Moressee | 310—191 |
| 3,093,763 | 6/1963 | Sargeant | 310—154 |
| 3,225,233 | 12/1965 | Kirilouckas | 310—154 |
| 3,242,365 | 3/1966 | Kober | 310—268 |

MILTON O. HIRSHFIELD, *Primary Examiner.*

J. W. GIBBS, *Assistant Examiner.*